US012686322B2

(12) United States Patent
Metternich

(10) Patent No.: US 12,686,322 B2
(45) Date of Patent: Jul. 21, 2026

(54) CONTAINER LOCKING DEVICE AND CONTAINER LOCKING METHOD

(71) Applicant: Hamburger Patent Schmiede GmbH, Buchholz (DE)

(72) Inventor: Heinz-Ruediger Metternich, Eversen-Heide (DE)

(73) Assignee: Hamburger Patent Schmiede GmbH, Buchholz (DE)

( * ) Notice: Subject to any disclaimer, the term of this patent is extended or adjusted under 35 U.S.C. 154(b) by 338 days.

(21) Appl. No.: 18/567,704

(22) PCT Filed: Jun. 14, 2022

(86) PCT No.: PCT/DE2022/100442
§ 371 (c)(1),
(2) Date: Dec. 6, 2023

(87) PCT Pub. No.: WO2022/268257
PCT Pub. Date: Dec. 29, 2022

(65) Prior Publication Data
US 2024/0262283 A1 Aug. 8, 2024

(30) Foreign Application Priority Data

Jun. 23, 2021 (DE) ..................... 10 2021 116 280.7
Sep. 1, 2021 (DE) ..................... 10 2021 122 625.2

(51) Int. Cl.
*B60P 7/13* (2006.01)
(52) U.S. Cl.
CPC .................................... *B60P 7/132* (2013.01)
(58) Field of Classification Search
CPC ...................................................... B60P 7/132
(Continued)

(56) References Cited

U.S. PATENT DOCUMENTS 4,108,081 A * 8/1978 Blanz ...................... B60P 7/132
410/82
4,352,613 A * 10/1982 Bertolini ................... B60P 7/13
410/82
(Continued)

FOREIGN PATENT DOCUMENTS

DE 19720238 A1 11/1998
DE 10202190 A1 8/2003
(Continued)

OTHER PUBLICATIONS

International Search Report mailed on Sep. 2, 2022, in International Application No. PCT/DE2022/100442.

*Primary Examiner* — Taras P Bemko
(74) *Attorney, Agent, or Firm* — Patent Central LLC; Stephan A. Pendorf

(57) ABSTRACT

A container locking device on a vehicle (F), for locking a container to be transported on a loading surface of the vehicle and having a corner fitting, comprising a lock housing (1), a locking bolt (2) and a drive (3), said locking bolt (2) having a shaft (20) and a locking head (21) which, in the unlocked state, can be introduced via an opening in the corner fitting of the container and, in the locked state, secures the container via projections engaging behind the opening in the corner fitting, the locking bolt (2) with its shaft (20) being mounted so as to be both axially movable in the lock housing (1) and also rotatable about its axis. A wedge slide (4) is mounted in the lock housing (1) so as to be movable to and fro laterally, that is to say perpendicularly to the axis of the locking bolt (2), and can be driven by the drive (3), and the wedge slide (4) has a lead-in slope which engages with the locking bolt (2) during the lateral movement of the wedge slide (4) and allows the locking bolt (2) an axial movement and a rotary movement about 90°, a horizontal lock bolt (7) being mounted in the lock housing
(Continued)

(1) so as to be axially and horizontal movable. The invention also relates to a container locking method for said container locking device.

10 Claims, 12 Drawing Sheets

(58) Field of Classification Search
USPC ........................................................ 410/82
See application file for complete search history.

(56) References Cited

U.S. PATENT DOCUMENTS

| | | | | |
|---|---|---|---|---|
| 5,575,599 | A | * | 11/1996 | Conlee ...................... B60P 7/13 410/70 |
| 5,931,617 | A | * | 8/1999 | Kroll ...................... B60P 7/132 410/94 |
| 6,092,967 | A | * | 7/2000 | Schulz ................... B60P 7/132 410/82 |
| 6,390,743 | B1 | * | 5/2002 | Metternich ............... B60P 7/13 410/82 |
| 12,515,578 | B2 | * | 1/2026 | Johansson ............... B60P 7/132 |
| 2015/0232015 | A1 | * | 8/2015 | Lanigan, Sr. ........... B60P 7/132 410/69 |
| 2017/0267160 | A1 | * | 9/2017 | Paulekuhn ............... B60P 7/13 |
| 2021/0394666 | A1 | * | 12/2021 | Newstead .......... B65D 90/0013 |
| 2025/0128654 | A1 | * | 4/2025 | Vähä-Piikkiö .......... B60P 1/483 |

FOREIGN PATENT DOCUMENTS

| | | | |
|---|---|---|---|
| DE | 102004045665 | A1 | 3/2006 |
| DE | 102006002654 | A1 | 8/2007 |
| DE | 202008011526 | U1 | 12/2009 |
| DE | 202010000387 | U1 | 6/2010 |
| DE | 102014218891 | A | 3/2016 |
| DE | 202018107146 | U1 | 3/2020 |
| DE | 102021112894 | A1 | 11/2022 |
| EP | 0934848 | A2 | 8/1999 |
| EP | 1075400 | B1 | 8/2004 |
| EP | 3666591 | A1 | 6/2020 |
| JP | 2011051559 | A | 3/2011 |

\* cited by examiner

M-M ( 1 : 2 )

N-N ( 1 : 2 )

Fig. 5b                    P-P ( 1 : 2 )
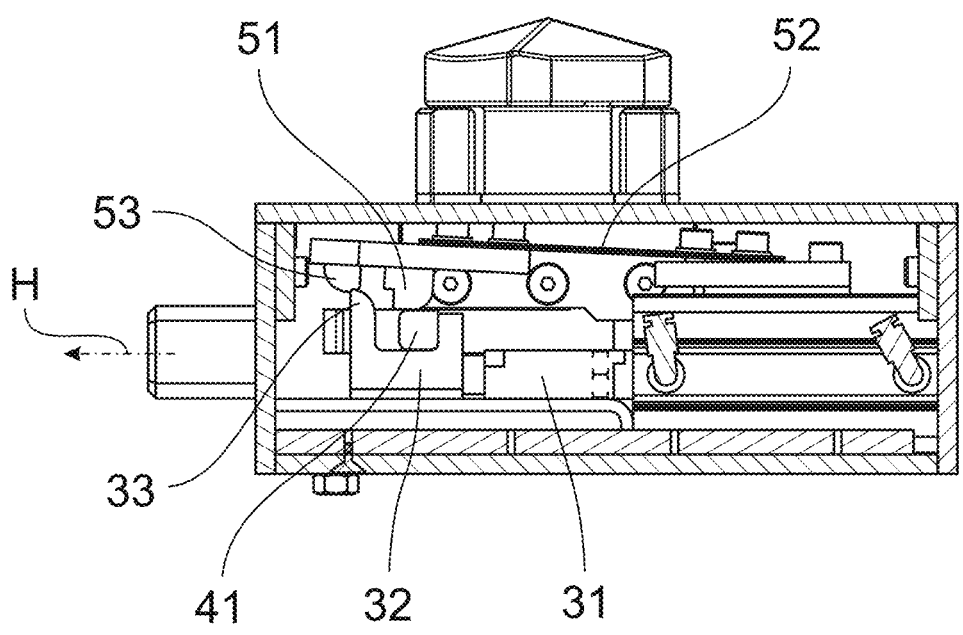
Fig. 5a
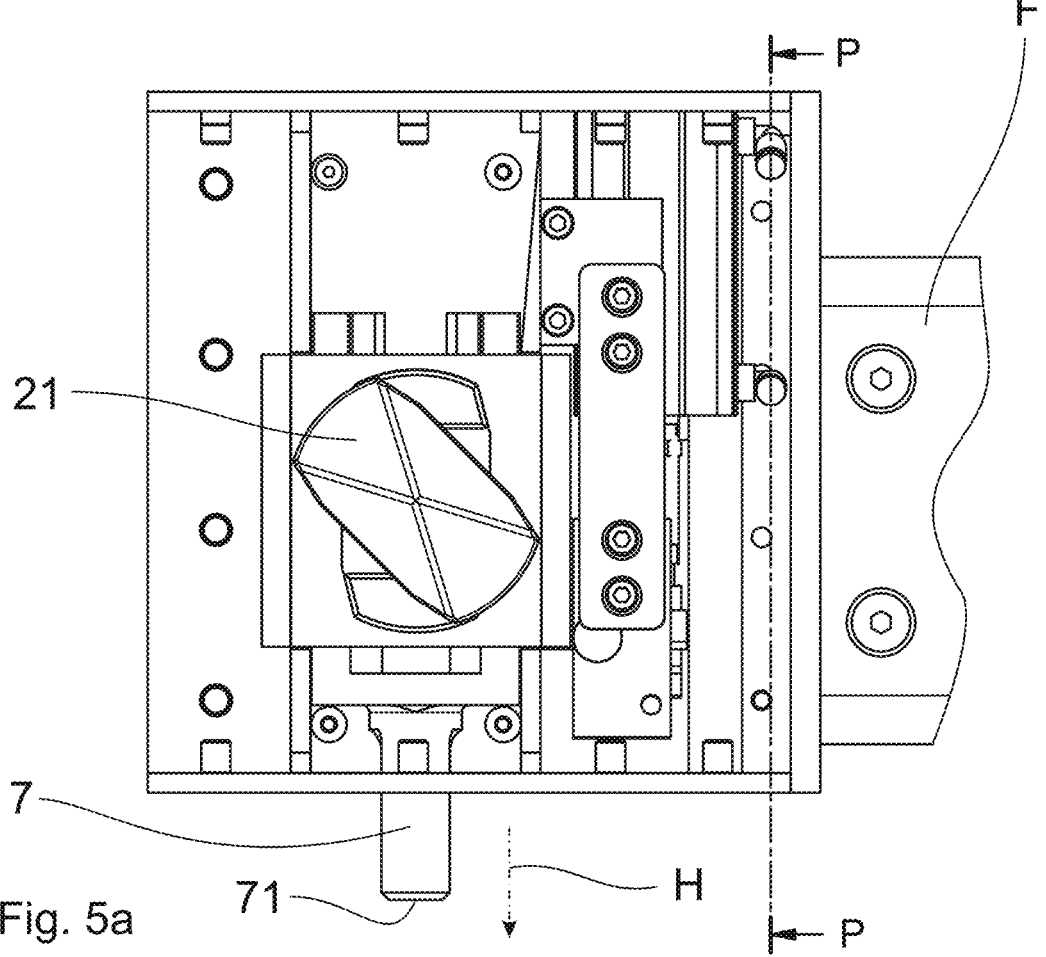

CONTAINER LOCKING DEVICE AND CONTAINER LOCKING METHOD

BACKGROUND OF THE INVENTION

Field of the Invention

The invention relates to a container locking device on a vehicle, for locking a container with a corner fitting to be transported on a loading surface of the vehicle, having a locking housing, a locking bolt and a drive, the locking bolt having a shaft and a locking head which, in the unlocked state, can be inserted in an opening of the corner fitting of the container and in the locked state secures the container via projections fitting behind the opening of the corner fitting, the locking bolt with its shaft being both axially displaceable and rotatable about its axis in the locking housing, a wedge slide is mounted in the locking housing so that it can move back and forth laterally, i.e. perpendicular to the axis of the locking bolt, and can be driven by the drive, and the wedge slide has a ramp which engages with the locking bolt during the lateral movement of the wedge slide and gives the locking bolt an axial movement and a rotational movement through 90°. The invention further relates to a container locking method that can be carried out using the above-mentioned device.

Description of the Related Art

Such a locking device for containers on a vehicle is known from EP 1 075 400 B1. A membrane storage drive is proposed as the drive for the linear movement, which is only held in its working position when compressed air is applied and is returned to its relieved position by means of a spring when the pressure drops. Thus with this locking device it is necessary to first activate the drive by applying compressed air before loading the vehicle in order to bring the locking device into its unlocked state in order to then be able to load the container with its corner fitting via the unlocked locking head. When the pressure is released, the spring-loaded membrane accumulator is then returned to its basic position, causing the locking bolt to rotate and lower.

Based on this, in the not yet published DE 10 2021 112 894 by the same applicant, a container locking device for locking a container with a corner fitting to be transported on the loading surface of a vehicle is filed.

DE 102 02 190 A1 describes a container-locking device similar to EP 1 075 400 B1, in which, however, the locking bolt on its shaft does not have a recess that rises tangentially to its circumference, but rather two pairs of cams arranged laterally one above the other and offset. Furthermore, the device can have an additional safety device which prevents the pivot pin from being pulled out vertically in the direction of the container in all positions of the locking bolt (pivot). The disadvantage is that the additional security has to be set and unlocked manually.

Furthermore, from DE 10 2006 002 654 A1 a device for actuating a lock of a locking head with a corner fitting of a container is known, which has a pneumatic piston-cylinder arrangement with which an extendable and lowerable claw of the locking head can be moved from a retracted position to an extended position and from there it has to be brought into the locking position and back again. Here too, a supplementary lock is not provided, so that the device is held in the locked position solely by the pneumatic drive. A technically similar design with hydraulic actuation is known from DE 20 2008 011 526 U1.

Horizontal locking devices on gooseneck trailers are also known. They are used at the front position on the trailer in the direction of travel to secure containers with gooseneck tunnels in their front position against lifting and sliding. At this position there is not enough free space below the container to provide the so-called "twistlocks" with the necessary substructure (cross members) that are usually used to fix standard containers on a trailer. However, since using the gooseneck chassis with so-called high cube containers with gooseneck tunnels provides around 10 to 14 cm more usable loading height without exceeding the internationally often prescribed total loading height of the tractor-trailer of 4 m, this considerable effort is justified.

In order to be able to load containers without a gooseneck tunnel on such gooseneck trailers or chassis, so-called double locks are known, in which a console that can be pivoted about a horizontal axis can be folded down to the position of the locking bolt in such a way that this console can be locked with the locking bolt and provides an increased support surface for containers without a gooseneck tunnel. A conventional twist lock is usually provided on this console to lock the container. Such a double lock is known, for example, from Jost-Werke GmbH, Siemensstrasse 2, 63263 Neu-Isenburg, under the name FB 88-14V. Such a double lock is also described in EP 0 934 848 A2 and, in a further development, also in DE 10 2014 218 891 A1.

EP 3 666 591 A1 describes a container lock with horizontal and vertical locking options that can be operated independently of one another.

The disadvantage, however, is that the horizontal locks, especially those used for gooseneck trailers at the frontmost position of the trailer for fixing containers with gooseneck tunnels, have to be locked and released manually. Before unloading and after loading, the known horizontal locks must be operated manually. In addition to the time required, this also poses a significant risk to the driver.

Therefore, in DE 20 2010 000 387 a horizontal locking device with a semi-automatic mechanism was proposed, in which the locking bolt has a spring load in the direction of the transport state and a run-up slope at its end facing the corner fitting, the locking bolt having a first locking position for the transport state of the locking bolt and a second locking position for the retracted unloading state and a sensing means is provided for determining the loading state of the loading surface, the locking bolt being manually brought into the unloading state for unloading and the locking bolt being released by the sensing means after unloading. This enables automatic securing and locking of the container when loading. The sensing device arranged next to the locking bolt allows it to be determined that a container is resting in the loading position. The disadvantage is that the sensing means is designed in many parts and, due to its complexity, can lead to malfunctions, for example if there is insufficient maintenance, and the locking device is expensive to produce.

From U.S. Pat. No. 5,575,599 horizontal locks that can be triggered by the weight of the container to be loaded are known, which are not safety locked in the locked state and therefore offer little security in the event of accidents or particularly heavy loads. A similar system is known from US 2015/0232015 A1.

DE 197 20 238 A1 describes a container locking device with a rotationally driven locking head, in which at the same time a horizontally movable plug pin for the so-called gooseneck container chassis is extended laterally via a gear segment with the rotary movement.

DE 10 2004 045 665 A1 shows a cross member for front installation in a chassis, in which a twist lock and a horizontal plug-in pin are arranged to be displaceable independently of one another.

JP 2011-051559 A describes a container chassis using horizontal and vertical locking means that can be actuated by actuating cylinders.

BRIEF SUMMARY OF THE INVENTION

Based on the prior art mentioned at the beginning, it is the object of the invention to provide an actively driven container lock or a container locking method which, in addition to the lock which engages from below in the container corner fitting, also alternatively makes horizontal locking for gooseneck containers possible.

This task is solved with a container locking device and a container locking method as described below.

The fact that a horizontal locking bolt is mounted in the locking housing in an axially and horizontally displaceable manner, with a gooseneck container in the loaded state on the vehicle with its corner fitting being arranged horizontally next to and adjacent to the locking housing, the horizontal locking bolt has a free end that in the unlocked state does not protrude laterally beyond the locking housing and, when locked, engages in a side opening of the corner fitting of the gooseneck container and secures the gooseneck container via the opening, and the wedge slide is mounted so that it can move back and forth in the horizontal direction of movement of the horizontal locking bolt and is connected to the horizontal locking bolt, a double lock is specified, which can secure both conventional containers with a locking mechanism that engages vertically from below, as well as gooseneck containers, i.e. containers with a gooseneck tunnel with a horizontal lock that is actively driven.

Alternatively, the wedge slide is mounted so that it can move back and forth in the horizontal plane perpendicular to the direction of movement of the horizontal locking bolt and the horizontal locking bolt is operatively connected to the wedge slide via a wedge drive. This also specifies a double locking system that can secure both conventional containers with a locking mechanism that engages vertically from below, as well as gooseneck containers, i.e. containers with a gooseneck tunnel with a horizontal locking mechanism that is actively driven. Particularly preferably, a compact drive option is achieved by redirecting the movement from the wedge slide by 90° to the horizontal locking bolt, which preserves valuable loading length on the vehicle.

If the drive has a double-acting pneumatic cylinder with a laterally movable piston rod, the piston rod being operatively connected to the wedge slide in such a way that an idle stroke occurs during the first part of the stroke movement of the drive and the lateral movement of the wedge slide occurs during the second part of the stroke movement, the wedge slide is only actuated in the second part of the stroke movement.

The fact that a safety locking device is arranged on the locking housing, which has a spring-loaded lock which is designed to intrude in the lateral movement path of the wedge slide, makes it technically easy to move the wedge slide and thus the horizontal locking bolt. The safety locking device activates a positive lock, which prevents the locking device from unintentionally reopening, both with regard to the horizontal locking bolt and the locking bolt due to the safety lock in the movement path of the wedge slide.

The fact that the locking device has a release mechanism for the lock, which releases the lock during the idle stroke, makes it possible for the locking device to be released during the idle stroke, i.e. in the first part of the stroke movement of the piston rod, so that the locking device is moved from the locked state to the unlocked state and can be opened.

In the event that there is insufficient compressed air resource and/or an error in the compressed air supply or the pneumatic cylinder, an emergency release is provided with which the positive safety lock of the locking device can be unlocked.

In a further embodiment, the emergency release has two thrust elements equipped with external threads, in which the first thrust element can be screwed into a first threaded hole in the safety locking device and the second thrust element can be screwed into a second threaded hole in the locking housing, the first thrust element releasing the lock and the second thrust element moving a wedge slide to open the lock. Thus, the safety locking device can be released with the first thrust element and the locking device can be adjusted from the locked state to the unlocked state with the second thrust element without the need for force actuation via the pneumatic cylinder (emergency unlocking). Accordingly, a container or a gooseneck container can be unloaded by manually operating the emergency release if the pneumatic system fails.

The fact that, in the particularly compact design of the lock with movement deflection by 90°, the wedge slide has a second driver which engages in the wedge slide, the wedge slide having an operating bevel which cooperates with a bearing surface of the horizontal locking bolt for the axial movement of the horizontal locking bolt, the first horizontal lateral movement of the wedge slide is converted via the operating bevel in the wedge slide into a perpendicular, second horizontal movement of the axially displaceably mounted horizontal locking bolt, whereby the wedge slide can be actuated in a known manner by a hydraulic cylinder arranged in its direction of movement, without this drive necessitating a further shortening of the usable loading length.

If a second idle stroke is formed between the second driver and the wedge slide, which moves the wedge slide when the wedge slide is actuated, and a contact surface arranged perpendicular to the direction of movement of the horizontal locking bolt is provided on the operating bevel, which blocks the horizontal locking bolt with the bearing surface of the horizontal locking bolt in the locked state, the horizontal locking bolt is mechanically locked against unintentional retraction. When the drive is actively operated to release the lock (adjustment from the locked to the unlocked state), this safety device first moves free and then the horizontal locking bolt is retracted into the unlocked state by sliding along the bearing surface on the operating bevel. The gooseneck container can now be unloaded.

According to the method, the container locking method is characterized in that an idle stroke is carried out during a first part of the stroke movement of the drive and the wedge slide is moved during a second part of the stroke movement, whereby when unlocking a container/gooseneck container from the locked state to the unlocked state during the first part of the stroke movement in the idle stroke, the lock is released and then during the second part of the stroke movement the wedge slide and thus the horizontal locking bolt is moved back and in parallel the locking bolt is first raised and then turned back into the unlocked state.

BRIEF DESCRIPTION OF THE SEVERAL VIEWS OF THE DRAWINGS

Two exemplary embodiments of the invention are described in detail below with reference to the accompanying drawings.

There is shown in.

DETAILED DESCRIPTION OF THE INVENTION

Figure 1:
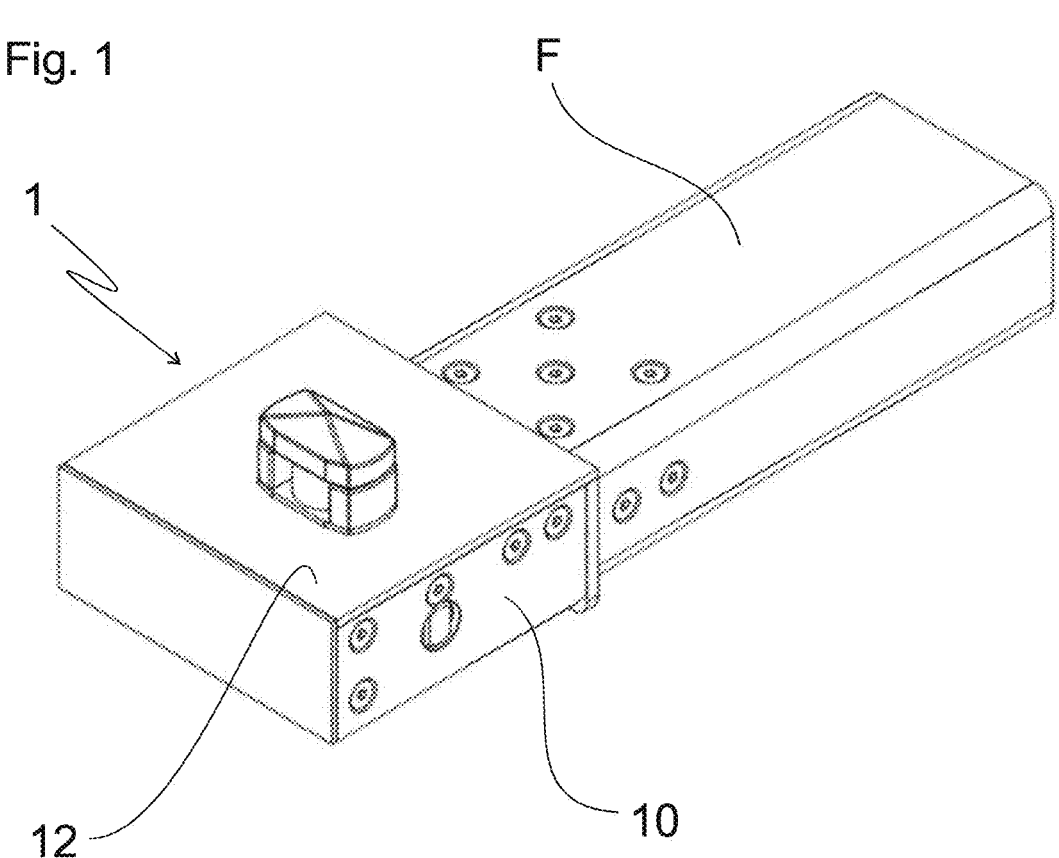
FIG. 1 a container locking device in a first exemplary embodiment in a spatial view in the unlocked state, FIG. 2 the container locking device according to FIG. 1 in a spatial view in the locked state, FIG. 3 *a, b* the container locking device according to FIG. 1 in top view and in cross section in the unlocked state, FIG. 4 *a, b* the container locking device according to FIG. 1 in top view and in cross section at the beginning of the locking process, FIG. 5 *a, b* the container locking device according to FIG. 1 in top view and in cross section during the further locking process, FIG. 6 *a, b* the container locking device according to FIG. 1 in top view and in cross section when reaching the locked state and FIG. 7 *a, b* the container locking device according to FIG. 1 in top view and in cross section when returning to the unlocked state.
Figure 2:
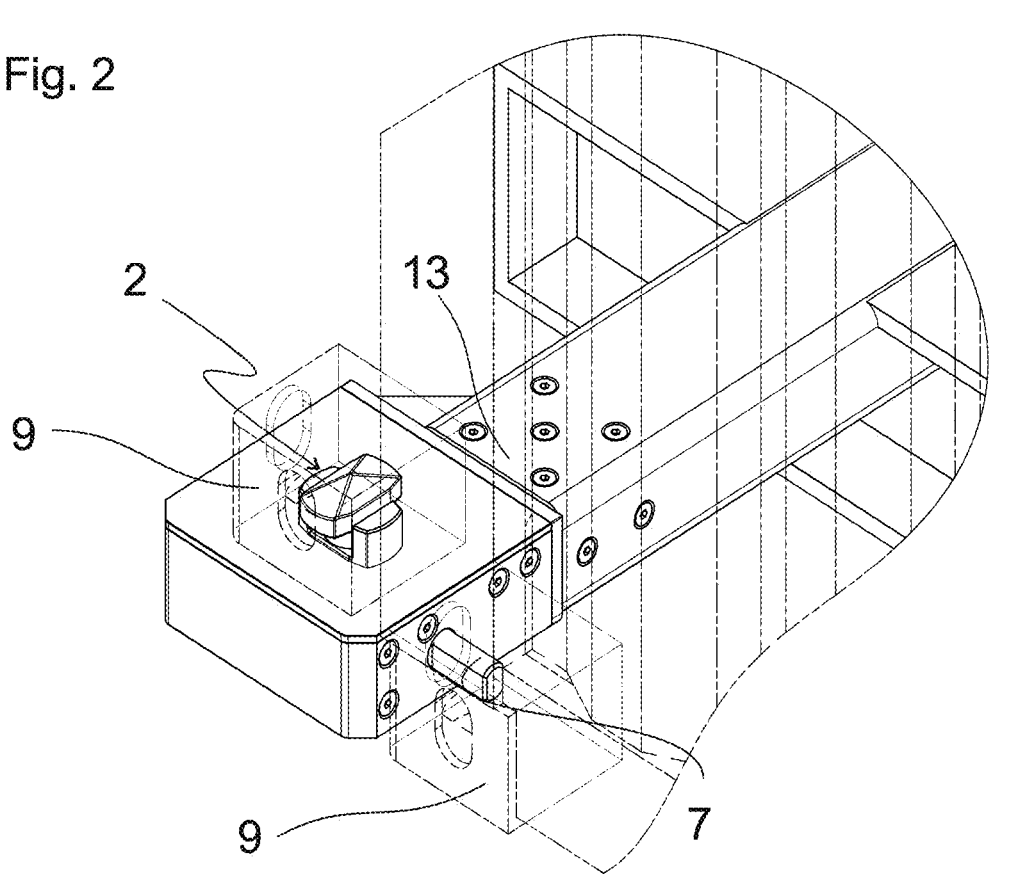

FIG. 1 shows a spatial view of a first embodiment of the container locking device, which is provided on a loading surface 13 of a vehicle F, in particular at the front end of a gooseneck semi-trailer, on which a container to be transported is to be placed. The locking device has a locking housing 1, which has a drive box 10 and a guide component 11 with load support surface 12 built thereon. The guide component 11 projects above the loading surface 13. The upwardly projecting guide component 11 fits into a corner fitting 2 of the container, so that the container rests on the loading surface 13, in particular the load support surface 12, so that it cannot slip. Alternatively, if a gooseneck container is loaded, it is loaded in a slightly lower position with its front two corner fittings resting against a locking housing 1 arranged there on the gooseneck trailer. The locking device in FIG. 1 is in the unlocked state, ready for loading or unloading a (gooseneck) container, and in FIG. 2 in the locked state, in which the (gooseneck) container is form-fit locked and friction locked to the loading area of the vehicle (gooseneck trailer).

To lock the loaded container, a locking bolt 2 is provided, which is mounted axially displaceable and rotatable along a central and vertical axis Z (see FIG. 4*b*) in the guide component 11. The locking bolt 2 has a cylindrical shaft 20, which is mounted and held in the locking housing 1 in an axially displaceable and rotatable manner. Furthermore, the locking bolt 2 at the upper end of the shaft 20 has a locking head 21, which has a mushroom-like but elliptical contour and, in an unlocked state, rests congruently on the guide component 11 and can be adjusted into a locked state in which the locking head 21 is rotated by 90° and lowered so that the projections now protruding from the elliptical locking head 21 over the guide component 11 engage behind the corner fitting 9 of the loaded container.

To lock a gooseneck container seated flush laterally against the locking housing 1 in a lower position, a horizontal locking bolt 7 is provided, which moves in the horizontal direction of movement from a retracted position in the unlocked state (FIG. 1), in which the horizontal locking bolt 7 does not protrude beyond the locking housing 1, into an advanced position in the locked state, in which the horizontal locking bolt 7 protrudes with a free end 71 beyond the locking housing 1 and there engages laterally in an opening in the corner fitting 9 of the gooseneck container.

The exact mode of operation and the components of the container locking device required for this are shown in FIGS. 3 to 7 in a top view of the container locking device (respectively for figure part a) and a cross section (respectively for figure part b).

Figures 3A, 3B:
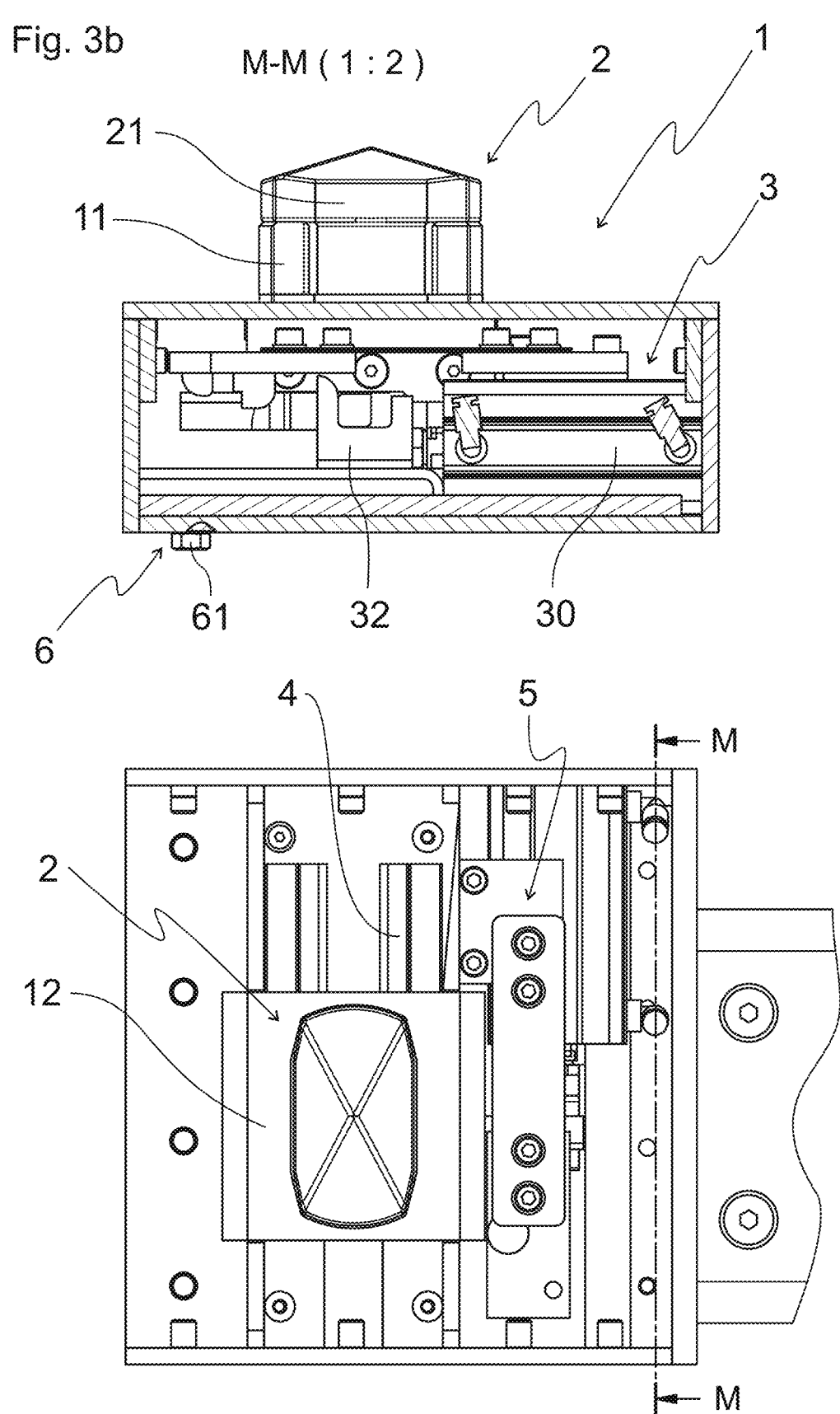

In FIG. 3 the container locking device is shown in its unlocked state, in which a container can be unloaded or loaded. This can be seen from the fact that the locking bolt 2 with its shaft 20 is in an elevated position, i.e. shifted axially upwards, and the locking head 21 belonging to the locking bolt 2 rests on the guide component 11, as can be seen in particular from FIG. 3*b*. Accordingly, a container with its corner fitting 9 and its elongated hole-like opening formed therein can be loaded onto the loading surface 13 and in particular onto the load support surface 12 via the locking head 21 and the guide component 11 or can be lifted from the loaded position, since the locking head 21 is aligned with the guide component 11 (see top view FIG. 3*a*). Furthermore, the horizontal locking bolt 7 is in its retracted position, in which the horizontal locking bolt 7 does not protrude beyond the locking housing 1.

Furthermore, in FIG. 3*a*, the drive 3 can be seen in top view in the form of a double-acting pneumatic cylinder 30, which is arranged in the drive box 10 of the locking housing 1. The double-acting pneumatic cylinder 30 has a piston rod 31, which interacts via a drive claw 32 on a wedge slide 4 which can be moved back and forth in the drive box 10 parallel to the pneumatic cylinder 30 via a driver 41. With regard to the design of the wedge slide 4 and its active connection to the locking bolt 2, reference is made to the not yet published DE 10 2021 112 894 by the same applicant, as the required rotational movement of the shaft 20 and thus the locking head 21 as well as the lowering or raising again are realized.

Figures 4A, 4B:
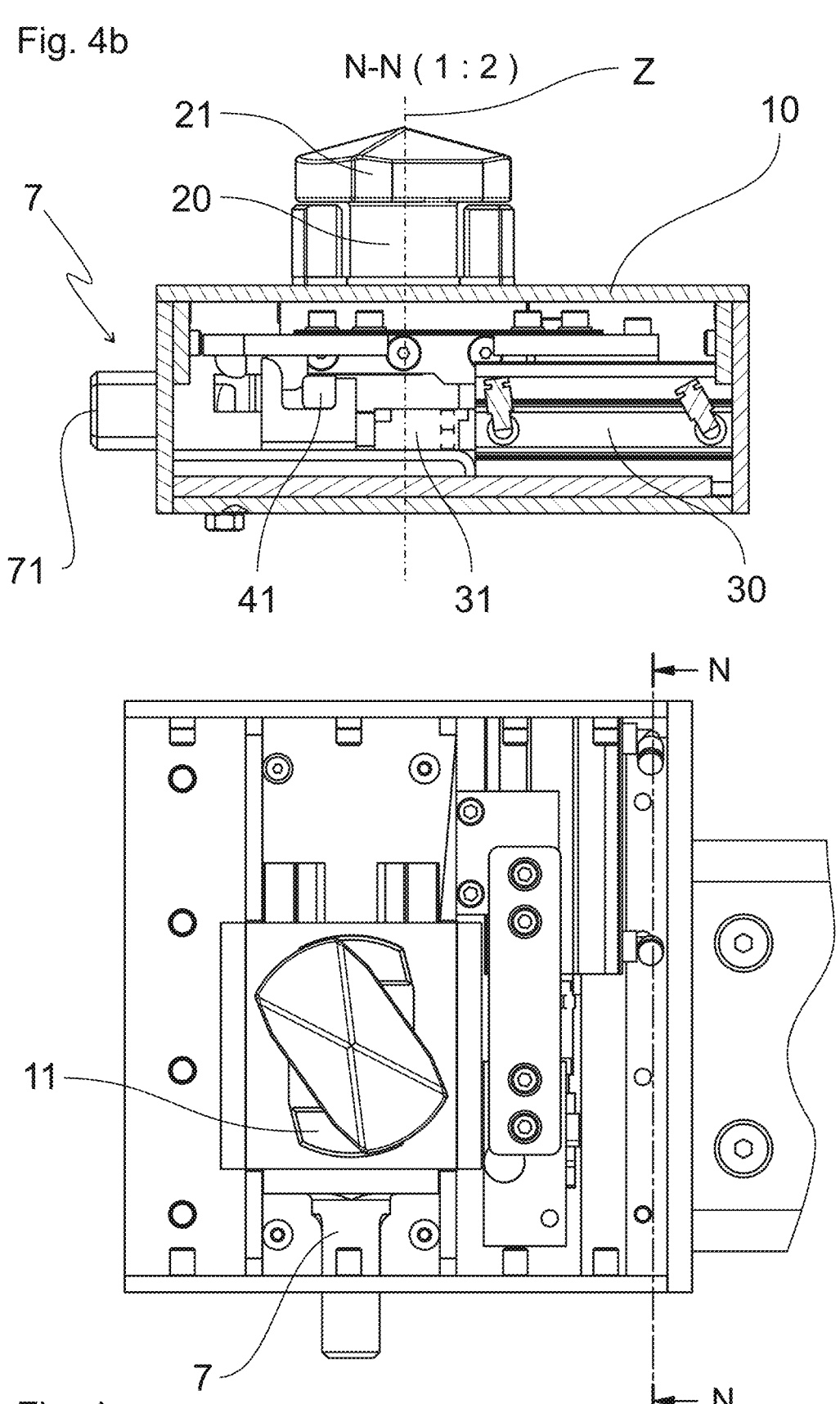

When the pneumatic cylinder 30 is actuated and the locking device is thus adjusted from the unlocked state to the locked state, the piston rods 31 with the drive claw 32 initially move from the position shown in FIG. 3*b* to the left in the plane of the drawing, as can be seen in comparison with FIG. 4*b*. The driver 41 is taken along by the drive claw 32, whereby the wedge slide 4 connected to the driver 41 also moves to the left in the drawing plane according to FIG. 4*b* or downwards in the drawing plane according to FIG. 4*a*. Since the horizontal locking bolt 7 is attached to the wedge slide 4 directly in an extension of its horizontal direction of movement, it also moves in this horizontal direction of movement and, as can be seen from FIGS. 4*a* and 4*b*, already protrudes a little beyond the locking housing 1. At the same time, the shaft 20 of the locking bolt 2 rotates and thus also begins to move towards the locked state.

FIG. 5 shows the further sequence of movements in the direction of the locked state, with the piston rod 31 of the pneumatic cylinder 30 being extended even further and therefore further in the horizontal direction of movement H via the drive claw 32 and the driver 41 of the wedge slide 4 (down in FIG. 5a) has been moved. Accordingly, the free end 71 of the horizontal locking bolt 7 protrudes even further and, in parallel, the locking head 21 is twisted even further to the left (see FIG. 5a in comparison to FIG. 4a).

Figure 6B:
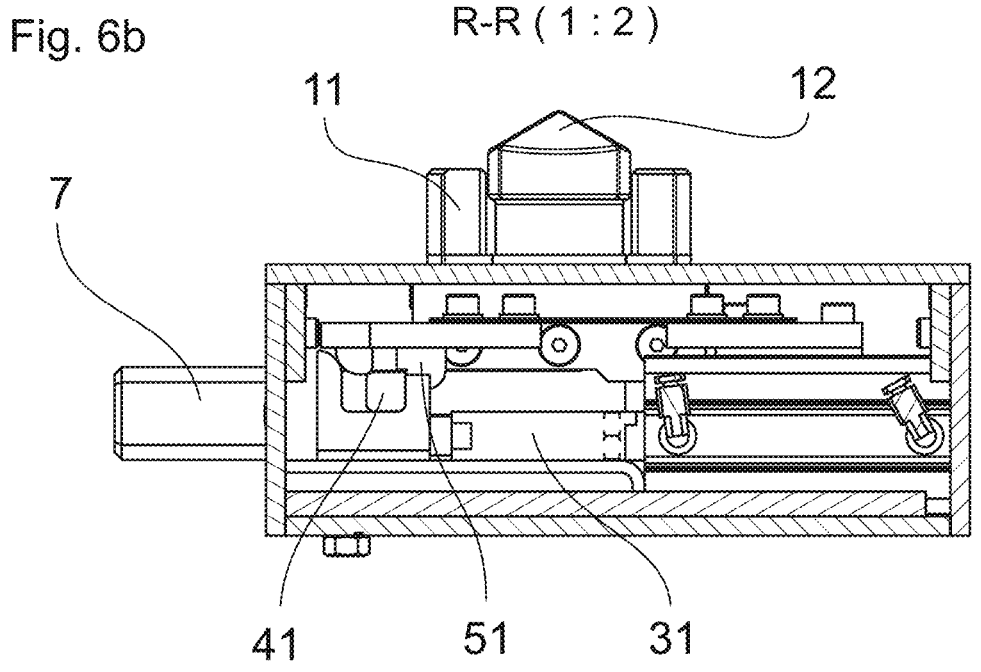
Figure 6A:
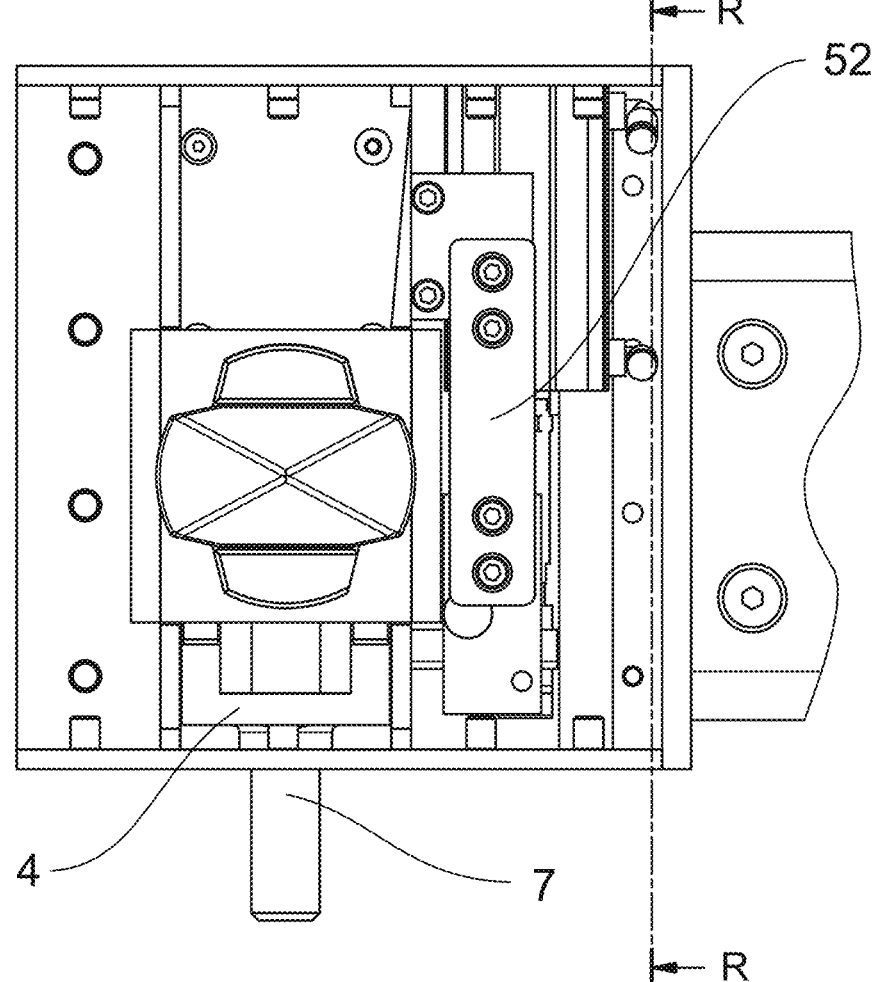

In FIG. 6 the locked state is then reached, in which the locking head 21 is now rotated by 90° and lowered between the guide component 11 (see FIGS. 6a and 6b). At the same time, the horizontal locking bolt 7 with its free end 71 can also be seen protruding far in its locked state. In this locked state, the free end 71 of the horizontal locking bolt 7 can engage laterally in a corner fitting 9 of a gooseneck container and thus firmly secure it.

Furthermore, reference is made to a locking device 5, which is arranged in the drive box 10 of the locking housing 1 and has a lock 51, which applies force via a leaf spring 52 to the drive claw 32 or the driver 41, so that when it reaches the end position in the locked state (FIG. 6b) it engages in the path of the wedge carriage 4, namely behind the driver 41, and there forms a positive lock against unwanted loosening (resetting) of the lock.

Figure 7A:
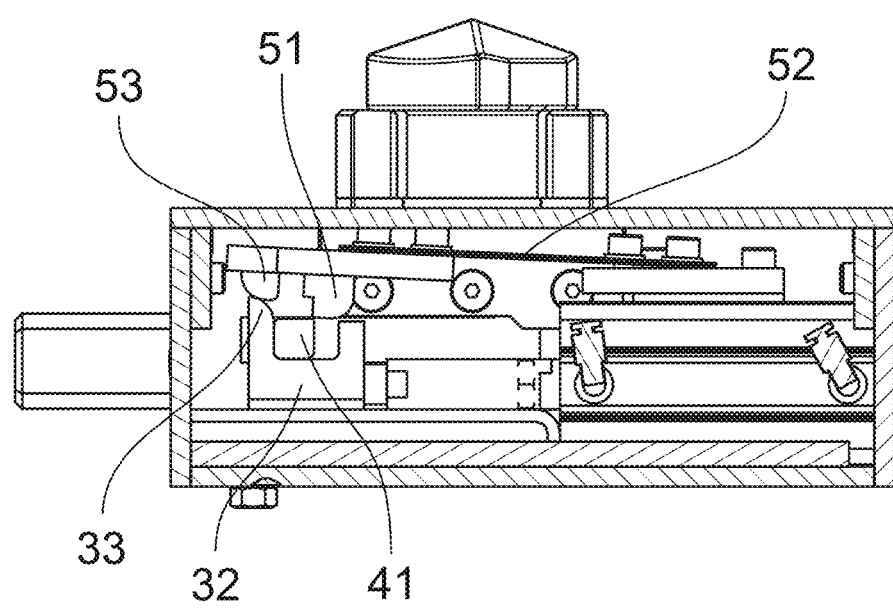
Figure 7A:
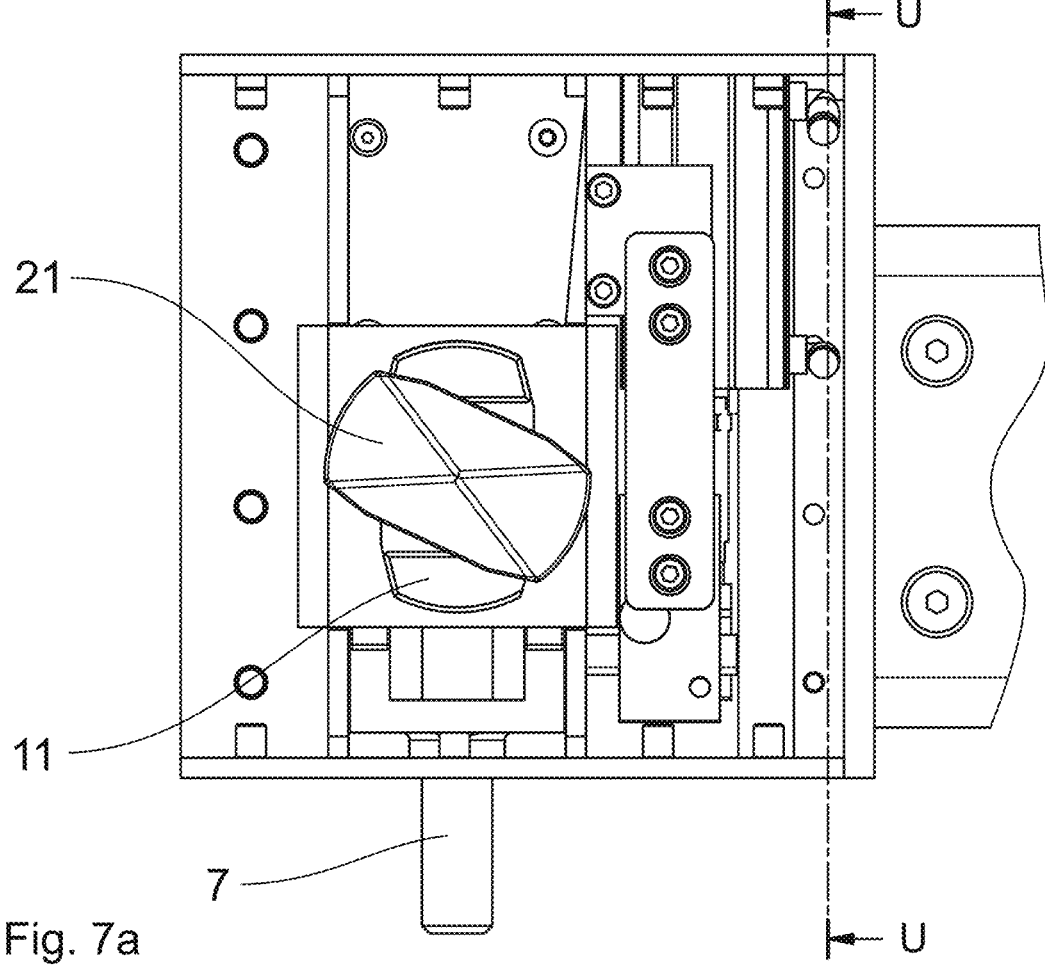
Figures 8, 9:
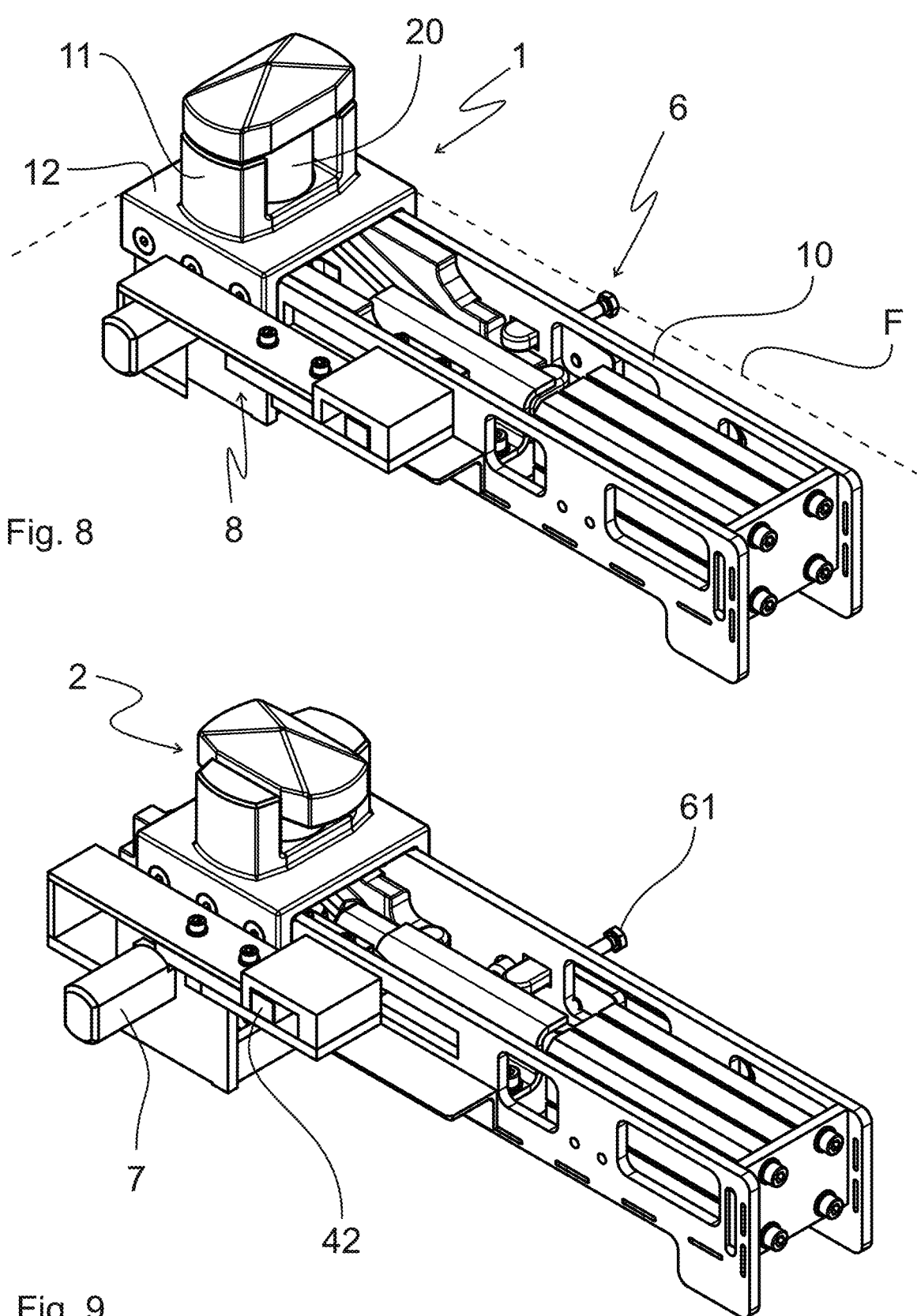
FIG. 8 a container locking device in a second exemplary embodiment in a spatial view in the unlocked state, FIG. 9 the container locking device according to FIG. 8 in a spatial view in the locked state, FIG. 10 *a, b, c* the container locking device according to FIG. 8 in side view, top view and in cross section in the unlocked state, FIG. 11 *a, b, c* the container locking device according to FIG. 8 in side view, top view and in cross section at the beginning of the locking process, FIG. 12 *a, b, c* the container locking device according to FIG. 8 in side view, top view and in cross section when the locked state is reached, FIG. 13 *a, b, c* the container locking device according to FIG. 8 in side view, top view and in cross section at the beginning of the reset to the unlocked state and FIG. 14 *a, b, c* the container locking device according to FIG. 8 in top view and in cross section while returning to the unlocked state.

To release the container lock from the locked state back to the unlocked state, the double-acting pneumatic cylinder 30 is activated to retract the piston rod 31, starting with FIG. 6 (locked state), the double-acting pneumatic cylinder 30 is activated to retract the piston rod 31, which initially results in a short idle stroke of the piston rod 31 in which the drive claw 32 is adjusted from its pushing position, which pushes the driver 41 to the left in the drawing plane of FIG. 5b, into the pulling position, which pulls the driver 41 to the right in the drawing plane of FIG. 7b and, with a release projection 33 on the drive claw 32, comes into contact with a displacement component 53 of the locking device 5.

During the further movement, namely the further retraction of the piston rod 31 into the pneumatic cylinder 30, the release projection 33 on the drive claw 32, via the displacement component 53 of the locking device 5, moves the lock 51 out of the movement path of the driver 41 (in the plane of the drawing) against the force of the leaf spring 52 (upwards in FIGS. 6b and 7b), whereby the driver 41 and thus the wedge slide 4 in the drive box 10 is released and the driver 41 prevents the lock 51 loaded by the leaf spring 52 from snapping back. The locking bolt 2 is raised completely in the axial direction, so that the projections of the locking head 21 are above the guide component 11 (FIG. 7b) and the locking head 21 is now rotated back, as can also be seen from the comparison of FIGS. 6b with 7b, in which the locking bolt 2 is raised and already turned back slightly.

As a result of the return movement of the wedge slide 4, the horizontal locking bolt 7 is also retracted, so that the unlocked state according to FIG. 3 is then established again.

Correspondingly, the locking bolt 2 rotates back into its unlocked state so that the locking head 21 lies flush over the guide component 11, as shown in the top view in FIG. 3a (unlocked state). Furthermore, an emergency release 6 (indicated only by screw 61 in FIGS. 3b to 7b) can be arranged on the container locking device, the screw 61 interacting with the locking device 5, so that when the screw 61 is screwed in, the lock 51 is released, is moved out of the lateral movement path of the driver 41 against the force of the leaf spring 52. Now the wedge slide 4, which is no longer locked, can be manually reset to its unlocked state according to FIGS. 3a and b using a push element, not shown here, for example if the compressed air supply fails or the pneumatic cylinder is damaged.

The container lock shown in FIGS. 8 to 14 in the second embodiment is designed analogously to the first, so that reference is made to the first three paragraphs of the description of the figures for the first embodiment.

To lock a gooseneck container that is loaded laterally against the locking housing 1 in a lower position, a horizontal locking bolt 7 is provided, which in the first horizontal direction of movement comes from a retracted position in the unlocked state (FIG. 8), in which the horizontal locking bolt 7 essentially does not extend beyond the locking housing 1, into an advanced position in the locked state (FIG. 9), in which the horizontal locking bolt 7 clearly protrudes with a free end 71 beyond the locking housing 1 and there engages laterally in an opening in the corner fitting 9 of the gooseneck container.

The exact operation and the components of the container locking device required for this are shown in FIGS. 10 to 14 in a side view (respective figure a part), a top view (respective figure b part) and a cross section (respective figure c part) of the container locking device.

Figures 10A, 10B, 10C:
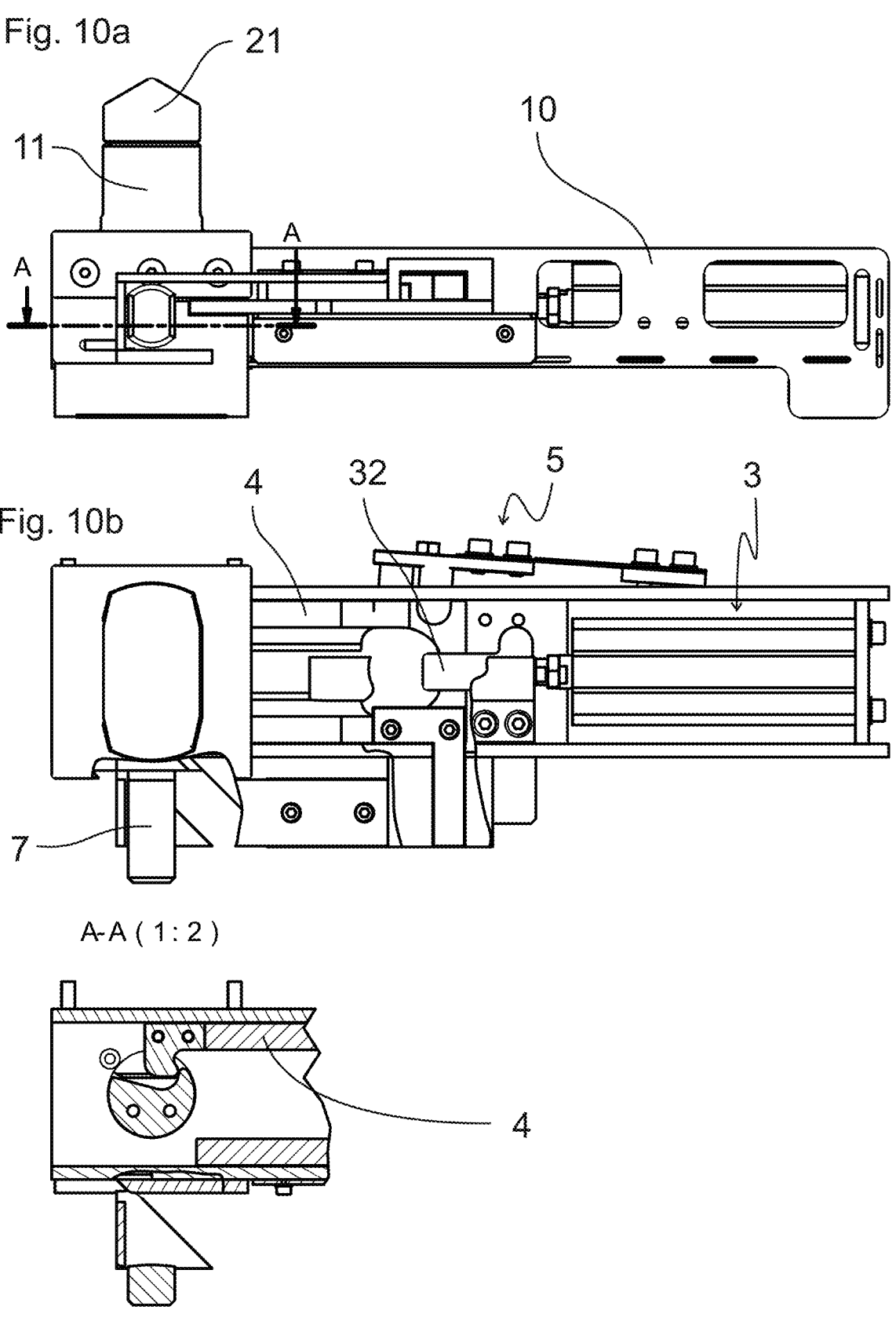

In FIG. 10 the container locking device is shown in its unlocked state, in which a container can be unloaded or loaded. This can be seen from the fact that the locking bolt 2 with its shaft 20 is in an elevated position, i.e. shifted axially upwards, and the locking head 21 belonging to the locking bolt 2 rests on the guide component 11, as can be seen in particular from FIG. 10a. Accordingly, a container with its corner fitting 9 and its elongated hole-like opening formed therein can be loaded onto the loading surface 13 and in particular onto the load support surface 12 via the locking head 21 and the guide component 11 or can be lifted from the loaded position, since the locking head 21 is aligned with the guide component 11 (see top view FIG. 10b). Furthermore, the horizontal locking bolt 7 is in its retracted position, in which the horizontal locking bolt 7 does not protrude significantly beyond the locking housing 1.

Furthermore, in FIG. 10b, a top view of the drive 3 can be seen in the form of a double-acting pneumatic cylinder 30, which is arranged in the drive box 10 of the locking housing 1. The double-acting pneumatic cylinder 30 has a piston rod 31, which interacts via a drive claw 32 on a wedge slide 4 which can be moved back and forth in the drive box 10 parallel to the pneumatic cylinder 30 via a first driver 41. With regard to the design of the wedge slide 4 and its operative connection to the locking bolt 2, reference is made to the not yet published DE 10 2021 112 894 by the same applicant. How the required rotational movement of the shaft 20 and thus the locking head 21 is achieved can be seen from the sectional view in FIG. 10c.

Figures 11A, 11B, 11C:
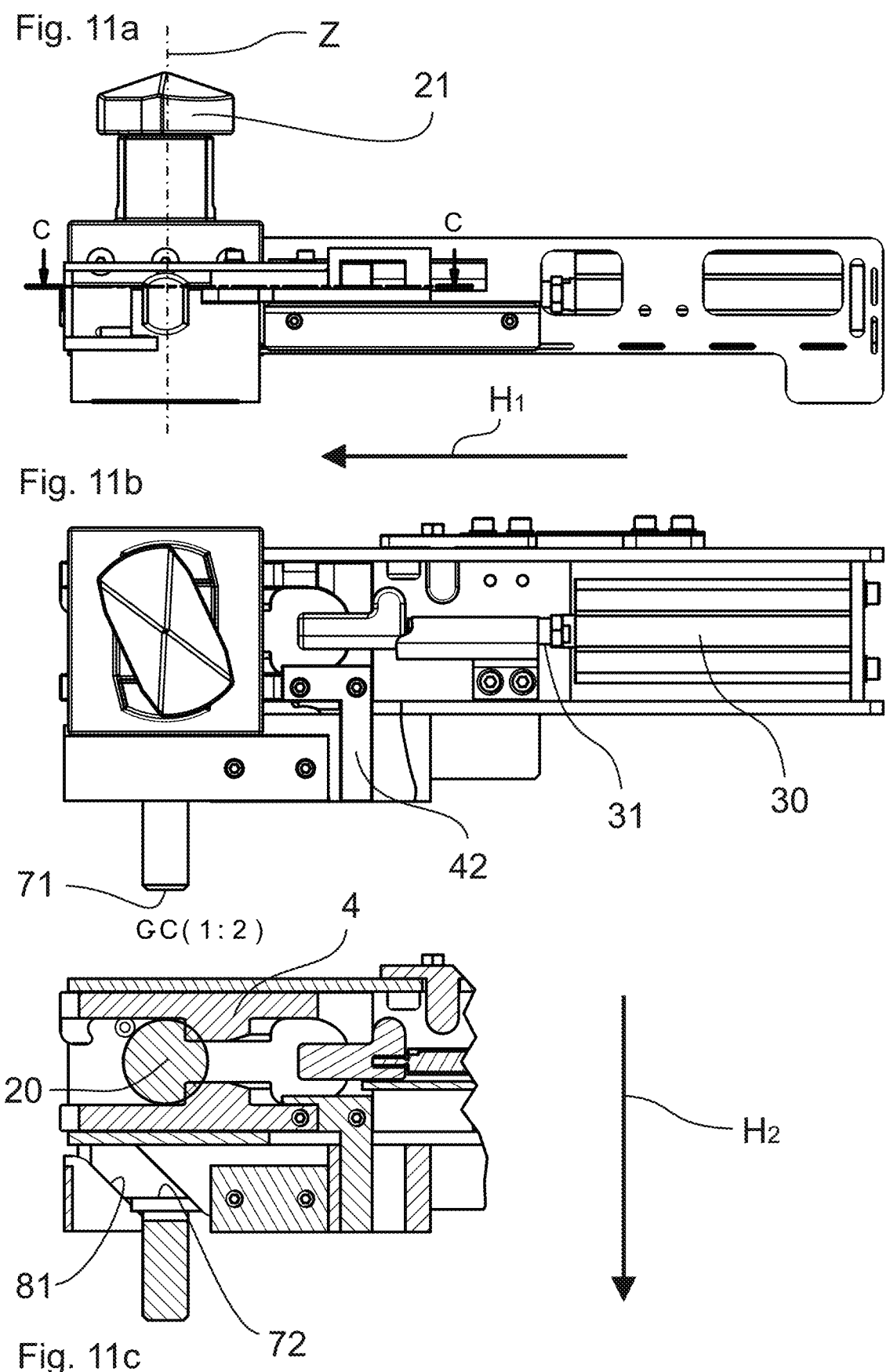

When the pneumatic cylinder 30 is actuated and the locking device is thus adjusted from the unlocked state to the locked state, the piston rods 31 with the drive claw 32 initially move from the position shown in FIG. 10b to the left in the plane of the drawing, as can be seen in comparison with FIG. 10b. The first driver 41 is taken along by the drive claw 32, whereby the wedge slide 4 connected to the first driver 41 also moves to the left in the plane of the drawing according to FIG. 10b. A second driver 42 is also formed on or attached to the wedge slide 4, which moves a wedge driver 8 on the locking housing 1 in the same first horizontal direction of movement (H$_1$), i.e. to the left in FIGS. 10b and 11b. An operating bevel (81) formed on the wedge drive (8) interacts with a bearing surface (72) on the horizontal locking bolt 7, whereby it moves in a second horizontal direction of movement (H₂) 90° to the first horizontal direction of movement (H₁) and, as can be seen in FIG. 11b, already clearly protrudes beyond the locking housing 1. At the same time, the shaft 20 of the locking bolt 2 twists and thus also begins to move towards the locked state.

Figures 12A, 12B, 12C:
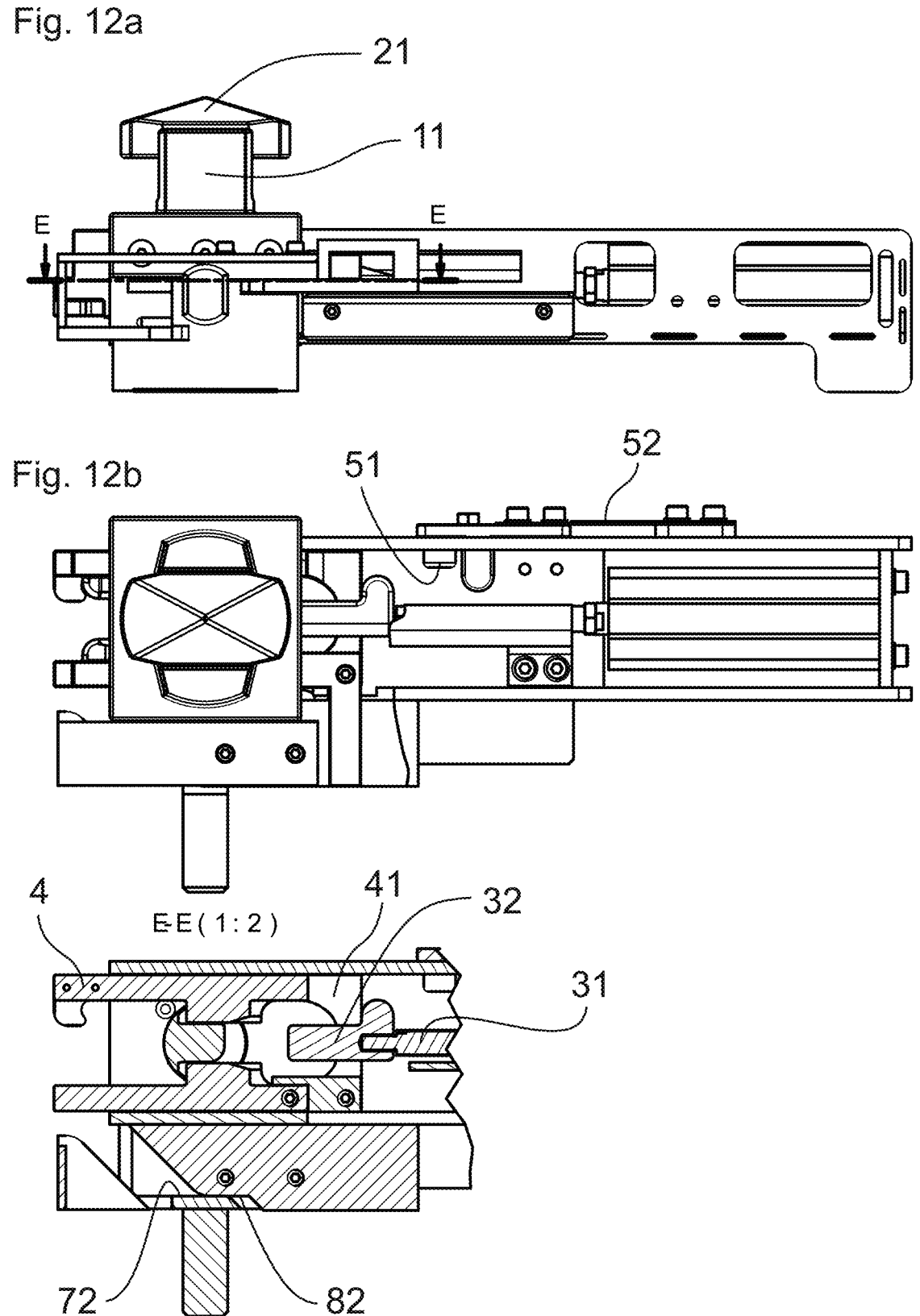

In FIG. 12 the locked state is then reached, in which the locking head 21 is now rotated by 90° and lowered between the guide component 11 (see FIGS. 12a and 12b). In parallel, the horizontal locking bolt 7 can also be seen in its locked state with its free end 71 protruding far. When the locked state is reached, due to the extension, namely moving the wedge slide (4) and thus the wedge driver (8) all the way to the left in the plane of the drawing according to FIG. 12, the bearing surface (72) of the horizontal locking bolt 7 slides along the operating bevel (81) of and thus parallel to the wedge drive (8) to its outer edge until the bearing surface (72) of the horizontal locking bolt 7 rests on the support surface (82) of the operating bevel (81) (see FIG. 12c). In this locked state, the free end 71 of the horizontal locking bolt 7 can engage laterally in a corner fitting of a gooseneck container and thus securely fix it, since the horizontal locking bolt 7 is secured against the support surface (82) and due to the positive contact of the bearing surface (72) of the horizontal locking bolt 7 is secured against an unintentional retraction in the second horizontal direction of movement (H₂).

Furthermore, reference is made to a locking device 5, which is arranged in the drive box 10 of the locking housing 1 and has a lock 51, which applies force via a leaf spring 52 to the drive claw 32 or the driver 41, so that it is in the locked state when the end position is reached (FIG. 12b) engages in the path of the wedge slide 4, namely behind the driver 41, and forms a positive lock there against unwanted loosening (resetting) of the lock.

Figures 13A, 13B, 13C:
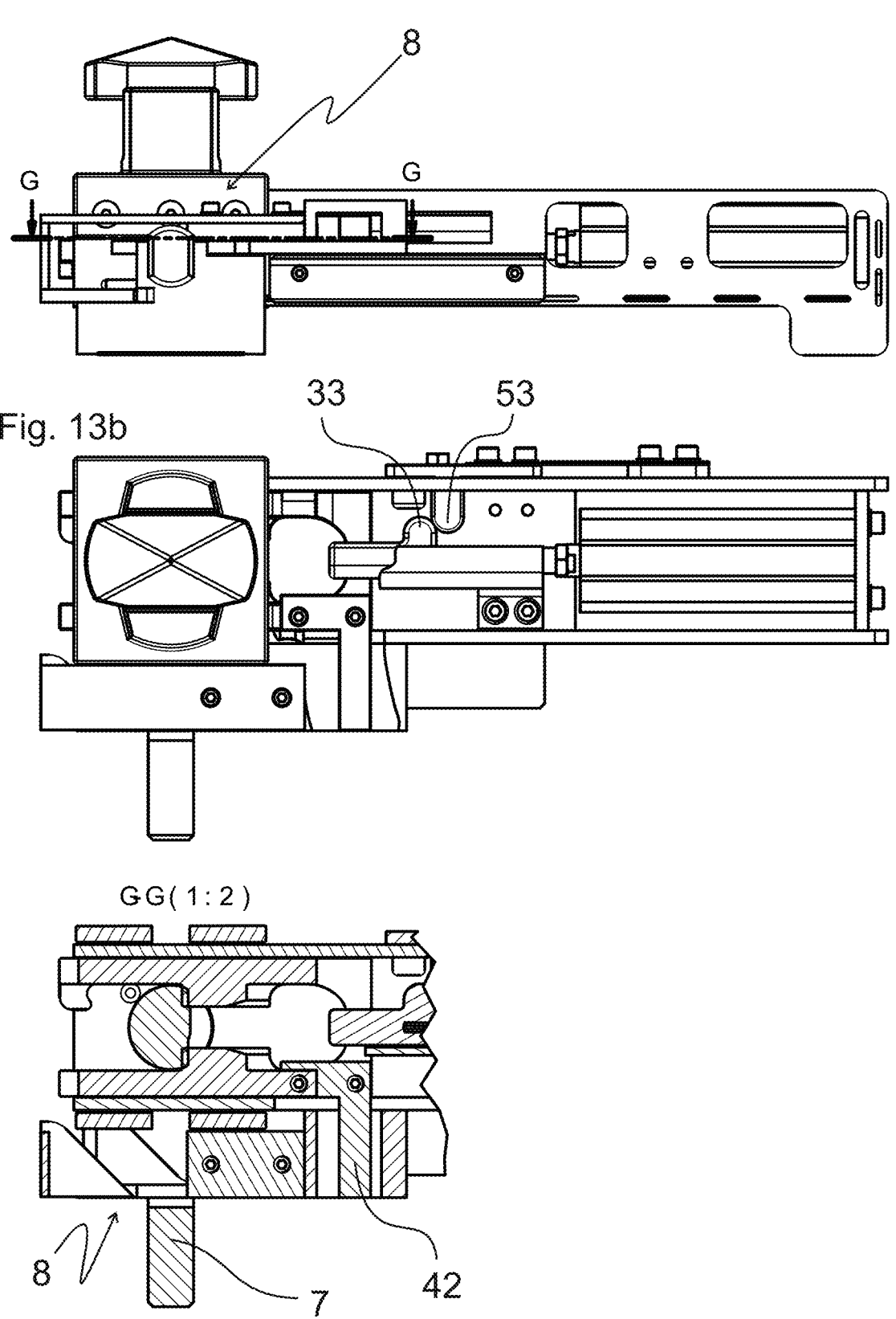
Figures 14A, 14B, 14C:
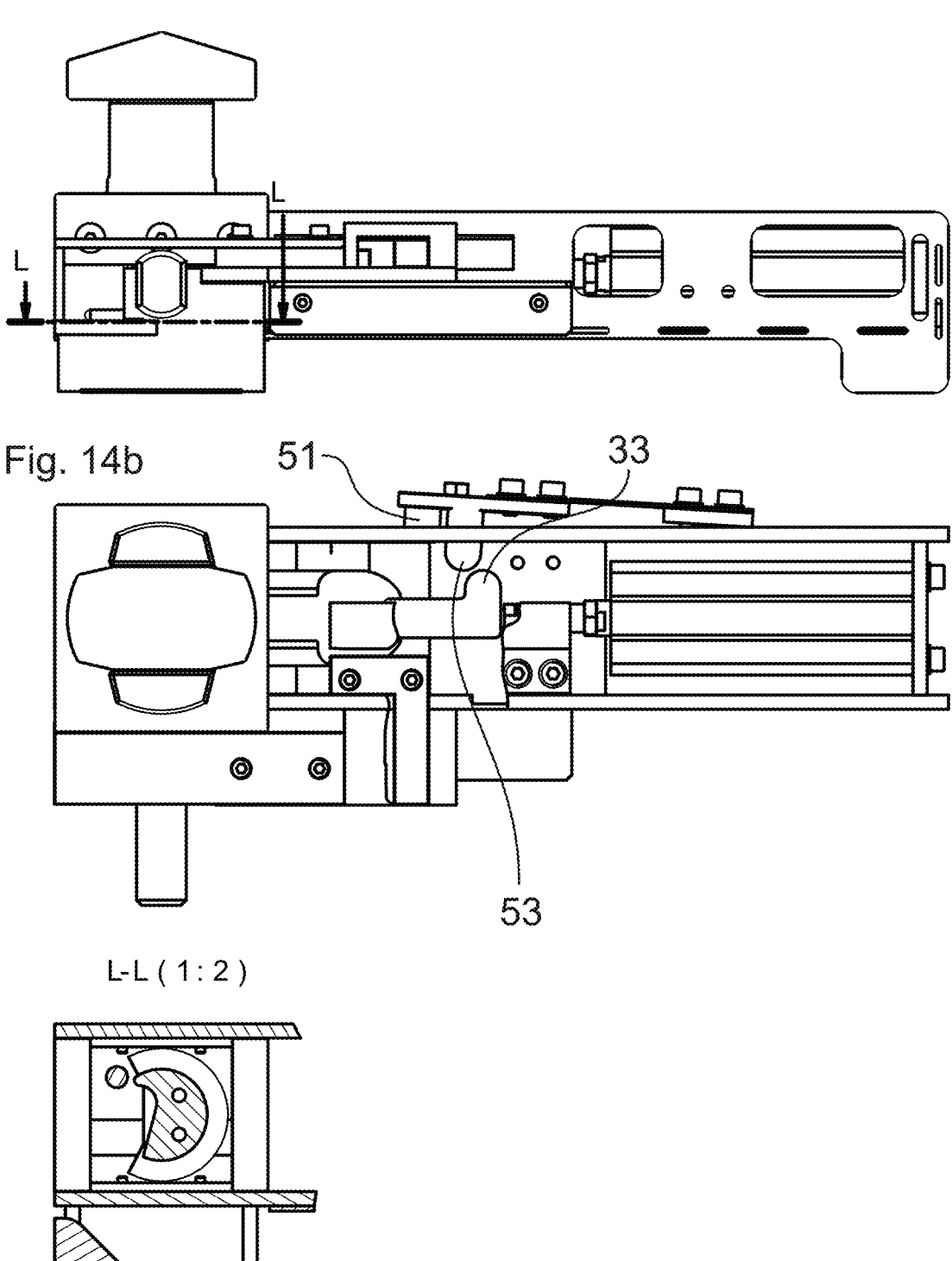

To release the container lock from the locked state back to the unlocked state, the double-acting pneumatic cylinder 30 is activated to retract the piston rod 31, starting from FIG. 12 (locked state), which initially results in a short first idle stroke of the piston rod 31, during which the drive claw 32 is moved from its pushing position pushing the first driver 41 to the left in the drawing plane of FIG. 11b into the pulling position pulling the first driver 41 to the right in the drawing plane of FIG. 13b and with a release projection 33 on the drive claw 32 comes into contact with a displacement component 53 of the locking device 5. In parallel, a second idle stroke is carried out between the second driver (42) and the wedge drive (8), so that the return movement of the wedge drive (8) in FIG. 13c against the first horizontal direction of movement (H₁) just begins and the positive contact of the bearing surface (72) of the horizontal locking bolt 7 on the support surface (82) is released.

During the further movement, namely the further retraction of the piston rod 31 into the pneumatic cylinder 30, the lock 51 is moved out of the movement path of the first driver 41 (in 13b and 14b), whereby the first driver 41 and thus the wedge slide 4 is released in the drive box 10 and the first driver 41 prevents the lock 51 loaded by the leaf spring 52 from snapping back. The locking bolt 2 is raised completely in the axial direction, so that the projections of the locking head 21 lie above the guide component 11 (FIG. 14a) and the locking head 21 can then be rotated back.

As a result of the return movement of the wedge slide 4, the horizontal locking bolt 7 is then retracted with the parallel return movement of the wedge drive (8) via the operating bevel (81) of the wedge drive (8), so that the unlocked state according to FIG. 10 is then established again. Correspondingly, the locking bolt 2 rotates back into its unlocked state so that the locking head 21 lies flush over the guide component 11, as shown in the top view in FIG. 10b (unlocked state).

REFERENCE SYMBOL LIST 1 locking housing
9 corner fitting
10 drive box
11 guide component
12 load support surface
13 loading surface
2 locking bolts
20 shaft
21 locking head
3 drive
30 pneumatic cylinders
31 piston rod
32 drive claw
33 release projection
4 wedge slide
41 first driver
42 second driver
5 locking device
51 lock
52 leaf spring
53 displacement component
6 emergency release
61 screw
7 horizontal locking bolt
71 free ending
72 storage space
8 wedge driver
81 operating bevel
82 support surface
F vehicle
H horizontal direction of movement
H₁ first horizontal direction of movement
H₂ second horizontal direction of movement
Z axis

The invention claimed is:

1. A container locking device on a vehicle (F), adjustable between a locked state for locking a container with a corner fitting (9) to be transported on a loading surface (13) of the vehicle (F) and an unlocked state in which the container can be loaded and unloaded, comprising a locking housing (1), a locking bolt (2) and a drive (3), wherein the locking bolt (2) has a shaft (20) and a locking head (21), which in the unlocked state the locking bolt (2) can be inserted via an opening in the corner fitting (9) of the container and in the locked state the locking bolt (2) secures the container via projections engaging behind the opening in the corner fitting (9), the locking bolt (2) is mounted with the shaft (20) of the locking bolt (2) both axially displaceable and rotatable about an axis in the locking housing (1), a wedge slide (4) is mounted in the locking housing (1) so that the wedge slide (4) can be moved back and forth laterally, i.e. perpendicular to the axis of the locking bolt (2), and can be driven by the drive (3), the wedge slide (4) has a ramp which engages with the locking bolt (2) during the lateral movement of the wedge slide (4) and gives the locking bolt (2) an axial movement and a rotational movement through 90°, a horizontal locking bolt (7) is mounted in the locking housing (1) so that the horizontal locking bolt (7) can move axially and horizontally, wherein a gooseneck container in a loaded state of the gooseneck container is arranged on the vehicle (F) with its corner fitting (9) horizontally adjacent and flush to the locking housing, the horizontal locking bolt (7) has a free end (71) which, in an unlocked state of the horizontal locking bolt (7), does not protrude laterally beyond the locking housing (1) and, in a locked state of the horizontal locking bolt (7), engages in a lateral opening in the corner fitting (9) of the gooseneck container and secures the gooseneck container via the opening, and the wedge slide (4) either a) is mounted so that the wedge slide (4) can move back and forth in the horizontal direction of movement of the horizontal locking bolt (7) and is connected to the horizontal locking bolt (7), or b) is mounted so that the wedge slide (4) can move back and forth in a horizontal plane perpendicular to the direction of movement of the horizontal locking bolt (7) and the horizontal locking bolt (7) is operatively connected to the wedge slide (4) via a wedge drive (8).

2. The container locking device according to claim 1, wherein the drive (3) has a double-acting pneumatic cylinder (30) with a laterally movable piston rod (31), the piston rod (31) being operatively connected to the wedge slide (4) in such a way that the first part of the stroke movement of the drive (3) is a first idle stroke and in the second part of the stroke movement the lateral movement of the wedge slide (4) takes place.

3. The container locking device according to claim 2, wherein a safety locking device is arranged on the locking housing (1), which has a spring-loaded lock (51) which is designed to intrude in the lateral movement path of the wedge slide (4).

4. The container locking device according to claim 3, wherein the safety locking device (5) has a release mechanism for the lock (51), which releases the lock (51) during the first idle stroke.

5. The container locking device according to claim 3, wherein an emergency release (6) is provided with which the form-fitting lock (51) of the safety locking device (5) can be unlocked.

6. The container locking device according to claim 5, wherein the emergency release (6) has two thrust elements (61) equipped with external threads, in which the first thrust element (61) can be screwed into a first threaded hole (54) in the safety locking device (5) and the second thrust element can be screwed in a second threaded hole in the locking housing (1), the first thrust element (61) releasing the safety lock and the second thrust element displacing the wedge slide (4) to open the safety lock.

7. The container locking device according to claim 1 with alternative feature b), wherein the wedge drive (8) has a second driver (42) which engages in the wedge drive (8), the wedge drive (8) having an operating bevel (81), which cooperates with a bearing surface (72) of the horizontal locking bolt (7) for axial movement of the horizontal locking bolt (7).

8. The container locking device according to claim 7, wherein a second idle stroke is formed between the second driver (42) and the wedge drive (8), which moves the wedge drive (8) when the wedge slide (4) is actuated, and on the operating bevel (81) there is a contact surface (82) arranged perpendicular to the direction of movement of the horizontal locking bolt (7), which blocks the horizontal locking bolt (7) with the bearing surface (72) of the horizontal locking bolt (7) in the locked state.

9. The method according to claim 7, wherein in a first part of the stroke movement of the drive (3) an idle stroke is carried out and in a second part of the stroke movement the wedge slide (4) is moved, whereby when unlocking a container or gooseneck container from the locked into the unlocked state during the first part of the stroke movement in the idle stroke the safety lock (51) is released and then during the second part of the stroke movement the wedge slide (4) is moved back, whereby the locking bolt (2) is first raised and then turned back into the unlocked state and at the same time the horizontal locking bolt (7) is retracted.

10. A method for locking a container with a corner fitting (9) on a vehicle (F) with a container locking device adjustable between a locked state for locking the container on a loading surface (13) of the vehicle (F) and an unlocked state in which the container can be unloaded or loaded, comprising:

placing a container with a corner fitting (9) on a loading surface (13) of a vehicle (F), and locking the container with the corner fitting (9) using a container locking device comprising a locking housing (1), a locking bolt (2) and a drive (3), wherein the locking bolt (2) has a shaft (20) and a locking head (21) which, in an unlocked state of the locking bolt (2), can be the container inserted via an opening in the corner fitting (9) of the container and, in a locked state of the locking bolt (2), secures the container via projections engaging behind the opening of the corner fitting (9), the locking bolt (2) with the shaft (20) is both axially displaceable in the locking housing (1) and rotatable about an axis of the locking bolt (2), a wedge slide (4) in the locking housing (1) can be moved back and forth laterally by the drive (3), i.e. perpendicular to the axis of the locking bolt (2), during the lateral movement of the wedge slide (4) by the drive (3) of the wedge slide (4), the locking bolt (2) first rotates axially by 90° when adjusting from the unlocked state to the locked state and then is lowered axially downwards towards the loading surface (13), and when the locked state is reached, a spring-loaded safety lock (51) intrudes in the lateral movement path of the wedge slide (4) and the wedge slide (4) is prevented from being reset, wherein simultaneously with the movement of the wedge slide (4), a horizontal locking bolt (7) in the locking housing (1) is displaced axially and horizontally, wherein the horizontal locking bolt (7) secures the gooseneck container in a loaded state of the gooseneck container arranged on the vehicle (F) with the corner fitting (9) of the gooseneck container horizontally adjacent and flush to the locking housing (1), engaging in a lateral opening in the corner fitting (9) of the gooseneck container and securing the gooseneck container.

* * * * *